United States Patent
Hwang et al.

(10) Patent No.: US 9,287,777 B2
(45) Date of Patent: Mar. 15, 2016

(54) AVERAGE CURRENT CONTROLLER, AVERAGE CURRENT CONTROL METHOD AND BUCK CONVERTER USING THE AVERAGE CURRENT CONTROLLER

(71) Applicant: Samsung Electro-Mechanics Co., Ltd., Gyeonggi-do (KR)

(72) Inventors: Jong Tae Hwang, Gyeonggi-do (KR); Chan Woo Park, Gyeonggi-do (KR); Sang Hyun Cha, Gyeonggi-do (KR); Deuk Hee Park, Gyeonggi-do (KR); Yun Joong Lee, Gyeonggi-do (KR)

(73) Assignee: SOLUM CO., LTD., Suwon-Si (KR)

( * ) Notice: Subject to any disclaimer, the term of this patent is extended or adjusted under 35 U.S.C. 154(b) by 288 days.

(21) Appl. No.: 13/826,872

(22) Filed: Mar. 14, 2013

(65) Prior Publication Data

US 2014/0184187 A1 Jul. 3, 2014

(30) Foreign Application Priority Data

Dec. 27, 2012 (KR) .......................... 10-2012-0155035

(51) Int. Cl.
*H02M 3/157* (2006.01)
*H05B 33/08* (2006.01)

(52) U.S. Cl.
CPC ........... *H02M 3/157* (2013.01); *H05B 33/0815* (2013.01)

(58) Field of Classification Search
CPC ................ H02M 3/156; H02M 3/157; H02M 2001/0025; H03K 4/502
See application file for complete search history.

(56) References Cited

U.S. PATENT DOCUMENTS

| | | | |
|---|---|---|---|
| 5,101,335 A | 3/1992 | Ludden et al. | |
| 5,600,234 A | 2/1997 | Hastings et al. | |
| 6,987,380 B1* | 1/2006 | Lee ................................ | 323/285 |
| 2003/0218893 A1 | 11/2003 | Tai et al. | |
| 2006/0158912 A1 | 7/2006 | Wu et al. | |
| 2009/0160422 A1* | 6/2009 | Isobe et al. ..................... | 323/349 |
| 2011/0068761 A1* | 3/2011 | Chen et al. ..................... | 323/282 |

(Continued)

FOREIGN PATENT DOCUMENTS

| | | | |
|---|---|---|---|
| JP | 2004-109444 | | 4/2004 |
| JP | 2009-225658 A | | 10/2009 |

(Continued)

OTHER PUBLICATIONS

Kr 10-2012-0155035 Notice of Allowance dated Dec. 16, 2013; 2pgs.

*Primary Examiner* — Harry Behm
(74) *Attorney, Agent, or Firm* — Bracewell LLP; Brad Y. Chin

(57) ABSTRACT

The present invention relates to an average current controller, an average current control method and a buck converter using the average current controller. The average current controller includes a first comparator for generating a high H signal, a multivibrator for generating a TAVG pulse signal by receiving a high H signal outputted from the first comparator, a timing generator for generating a signal CH_ON to charge/discharge a capacitor by using at least the TAVG pulse signal, an integrator circuit unit for charging/discharging the capacitor, a second comparator for outputting a corresponding signal, an up/down counter for increasing or decreasing a counting value and a digital/analog converter for outputting by converting an output (digital signal) of the up/down counter into an analog signal.

22 Claims, 12 Drawing Sheets

(56) References Cited

U.S. PATENT DOCUMENTS

| | | | |
|---|---|---|---|
| 2011/0156680 A1* | 6/2011 | Yeh | 323/282 |
| 2012/0049753 A1* | 3/2012 | Hwang et al. | 315/224 |
| 2014/0091870 A1* | 4/2014 | Morris | 331/111 |

FOREIGN PATENT DOCUMENTS

| | | |
|---|---|---|
| KR | 10-2009-0063129 A | 6/2009 |
| KR | 10-2012-0019642 A | 3/2012 |

* cited by examiner

- PRIOR ART -

- PRIOR ART -

[FIG. 8A]

INDUCTOR AVERAGE CURRENT = Iavg

INDUCTOR AVERAGE CURRENT < Iavg

AVERAGE CURRENT CONTROLLER, AVERAGE CURRENT CONTROL METHOD AND BUCK CONVERTER USING THE AVERAGE CURRENT CONTROLLER

CROSS-REFERENCE TO RELATED APPLICATIONS

Claim and incorporate by reference domestic priority application and foreign priority application as follows:

"CROSS REFERENCE TO RELATED APPLICATION

This application claims the benefit under 35 U.S.C. Section 119 of Korean Patent Application Serial No. 10-2012-0155035, entitled filed Dec. 27, 2012, which is hereby incorporated by reference in its entirety into this application."

BACKGROUND OF THE INVENTION

1. Field of the Invention

The present invention relates to an average current controller, an average current control method and a buck converter using the average current controller; and more particularly, to an average current controller, an average current control method and a buck converter using the average current controller capable of overcoming problems that an average current level is changed and a current control becomes difficult in case when an on-time is short.

2. Description of the Related Art

In general, a driving circuit of a display device such as an LED (Light Emitting Diode) mainly uses a linear control method to control a constant current and a PWM (Pulse Width Modulation) method to use a switch. However, the PWM method capable of maximizing the efficiency is preferred to the linear control method having a low efficiency. And also, since the voltage to drive the LED is often higher than that of the LED, the converter in a type of buck is mainly used.

FIG. 1 is a view showing a conventional off-time control type buck converter.

Referring to FIG. 1, if the switch 103 is turned on, the current flows into a load 105, e.g., an LED, an inductor 104 and a switch 103. At this time, the current flowing into the switch is sensed by an Rcs 107 to thereby found its size.

If the value obtained by converting the current of the switch 103 into a voltage by the Rcs 107 is equal to or greater than a peak level, the switch 103 is turned off since the comparator 101 resets an SR latch 102.

If the switch is turned off, the switch 103 is turned on by setting the SR latch 102 again after a predetermined time by using the timer 106 to measure the off-time.

Accordingly, the controller performs a constant off-time operation to be turned off during a predetermined time, and the output current is determined as the Rcs 107 and the peak level uniformly.

In the above off-time control type buck converter, if a power voltage, an inductor, a load voltage and a current ripple are represented as $V_S$, L, $V_F$ and $\Delta I$, respectively, the on-time Ton can be described as follows.

$$T_{on} = \frac{L}{V_S - V_F} \cdot \Delta I$$

And also, the off-time Toff is determined by the load voltage $V_F$ and can be represented as follows:

$$T_{off} = \frac{L}{V_F} \cdot \Delta I$$

As described above, since the off-time control type buck converter controls the constant off-time, the off-time Toff is constant, whereby the current ripple $\Delta I$ is proportional to the load voltage $V_F$. Accordingly, as shown in FIG. 2, although the peak current is controlled constantly in case when the load voltage $V_F$ is different, the average current is changed because the ripple current is different. Particularly, as increasing the ripple as increasing the load voltage $V_F$, the average current is reduced.

Accordingly, in case when the LED is controlled by using the buck converter using the off-time control method, there are problems as follows.

At first, since the load voltage drops of the LEDs have different characteristics for each manufacturer, it is difficult to control the average current.

Secondly, since the load voltage of the LED has a property being inversely proportional to the temperature, the average currents of the LEDs become different at high temperature/low temperature according to this.

Thirdly, since the whole load voltage is changed in case when the number of loads is changed, the average current of the LEDs are changed.

On the other hand, in the Korean Patent Laid-open Publication No. 10-2012-0019642 (AVERAGE CURRENT CONTROLLER), by comparing the time T1 when the current of the switch reaches the average current IAVG to the time T2 to reach the peak current IPEAK at the average current IAVG, if T1>T2, the level of the peak current IPEAK is raised; and, if T1<T2, the level of the peak current IPEAK is lowered. Since T1 and T2 become the same approximately in such control method, the average current becomes IAVG.

However, in the control method of the above conventional average current controller, two comparators are required for sensing to reach the average current IAVG and the peak current IPEAK, there is a problem that the average current level is changed due to the delay generated from a signal processing relationship of two comparators. And also, in case when the on-time T1+T2 are very short, the control of the current becomes very difficult.

RELATED ART DOCUMENT

Patent Document

Patent Document 1: United State Patent Laid-open Publication No. 2003-0218893
Patent Document 2: Japan Patent Laid-open Publication No. 2009-225658

SUMMARY OF THE INVENTION

The present invention has been invented in order to overcome the above-described problems and it is, therefore, an object of the present invention to provide an average current controller, an average current control method and a buck converter using the average current controller capable of overcoming problems that the average current level is changed due to the delay generated in two comparator in the conventional average current controller and the control of current is difficult when the on-time is short.

In accordance with one aspect of the present invention to achieve the object, there is provided an average current controller comprising:

a first comparator for generating a high H signal when a current level of a main switch of a buck converter reaches an average current level;

a multivibrator for generating a TAVG (an average switching period) pulse signal by receiving a high H signal outputted from the first comparator;

a timing generator for generating a signal CH_ON to charge/discharge a capacitor by using at least the TAVG pulse signal;

an integrator circuit unit for charging/discharging the capacitor by receiving the capacitor charging/discharging signal CH_ON generated from the timing generator and a capacitor charging/discharging current from the outside;

a second comparator for outputting a corresponding signal by determining whether a voltage Vc between both ends of the capacitor charged/discharged during a period is a positive (+) or a negative(−);

an up/down counter for increasing or decreasing a counting value by synchronizing a clock according to an output of the second comparator; and a digital/analog converter for outputting by converting an output (digital signal) of the up/down counter into an analog signal.

Herein, the multivibrator is a monostable multivibrator.

And also, the timing generator generates a signal CH_ON for charging/discharging the capacitor by using a HTOFF signal which means reaching a half of the TAVG signal, a gate driving signal Q and a Toff (a continuation time of a switch off state).

And also, the timing generator generates a reset signal for initializing the capacitor of the integrator circuit unit.

And also, the integrator circuit unit includes an integrator capacitor Cint to perform charging/discharging operations by receiving charging/discharging currents from outside and a plurality of switches M1~M4 for charging/discharging the integrator capacitor Cint.

And also, the integrator circuit unit further includes an additional switch integrator capacitor M5 for initializing the integrator capacitor Cint to be switched on by receiving a reset signal outputted from the timing generator.

At this time, the first plurality of switches M1~M4 form first and second unit circuits to be connected in parallel, each of the unit circuits is formed of a serial connection circuit of PMOS and NMOS.

At this time, if the signal CH_ON generated from the timing generator for charging/discharging the capacitor is low L, the capacitor Cint is charged by turning on the PMOS (M3) of the first unit circuit and the NMOS (M4) of the second unit circuit, and if the signal CH_ON generated from the timing generator for charging/discharging the capacitor is high H, the capacitor Cint is discharged by turning on the PMOS (M1) of the second unit circuit and the NMOS (M4) of the first unit circuit.

And also, if a Vc being a voltage between both ends of the capacitor≤0, the second comparator outputs a low signal L; and, if the Vc≥0, the second comparator outputs a high signal H.

At this time, if an output of the second comparator is high H, the up/down counter increases a counting value by being synchronized to the clock CLK; and, if the output of the second comparator is low L, the up/down counter decreases the counting value.

And also, if an output of the second comparator is high H, the up/down counter increases a counting value by 1; and, if the output of the second comparator is low L, the up/down counter decreases the counting value by 1.

And also, the if an output of the digital/analog converter converts an output (digital signal) of the up/down counter into an analog signal of PLL (Pseudo Peak Level) to output the converted signal.

Further, in accordance with another aspect of the present invention to achieve the object, there is provided a buck converter using an average current controller, comprising:

an average current controller for generating a TAVG (an average switching period) pulse signal by comparing a level of current flowing into a main switch of the buck converter when a current level of the main switch reaches an average current level, performing the generation of capacitor charging/discharging signal CH_ON by using the TAVG signal and charging/discharging a capacitor, and generating a corresponding signal by determining the +/− state of a voltage Vc between both ends of the capacitor charged/discharged during one period; and a buck converter unit for turning off the main switch by resetting an SR latch when a level of current flowing in the main switch is above a level of an output signal from the average current by comparing a level of an output signal from the average current to a level of current flowing in the main switch.

And also, the average current controller includes:

a first comparator for generating a high H signal when a main switch current of the buck converter unit reaches an average current level;

a multivibrator for generating a TAVG (an average switching period) pulse signal by receiving a high H signal outputted from the first comparator;

a timing generator for generating a signal CH_ON to charge/discharge a capacitor by using at least the TAVG pulse signal;

an integrator circuit unit for charging/discharging the capacitor by receiving the capacitor charging/discharging signal CH_ON generated from the timing generator and a capacitor charging/discharging current from the outside;

a second comparator for outputting a corresponding signal by determining whether a voltage Vc between both ends of the capacitor charged/discharged during a period is a positive (+) or a negative(−);

an up/down counter for increasing or decreasing a counting value by synchronizing a clock according to an output of the second comparator; and a digital/analog converter for outputting by converting an output (a digital signal) of the up/down counter into an analog signal.

And also, the buck converter includes:

a comparator (a third comparator) for outputting a signal corresponding to a comparison result by comparing a level of an output signal from the average current controller unit to a level of current flowing into the main switch;

an SR latch for outputting a signal to turn on or off the main switch by receiving an output from the comparator (the third comparator); and a gate driver for turning on or off the main switch by being driven according to a signal of the SR latch.

Herein, the buck converter using the average current controller further comprises a timer for turning o the main switch by setting the SR latch again after a predetermined time by measuring an off-time if the main switch is turned off.

Further, in accordance with another aspect of the present invention to achieve the object, there is provided an average current control method by using an average current controller which is constituted of a first comparator, a multivibrator, a timing generator, an integrator circuit unit, a second comparator, an up/down counter and a digital/analog converter, comprising:

determining whether a current level of a main switch of a buck converter reaches an average current level or not by comparing an average current level and a current level flowing into the main switch of the buck converter to the first comparator;

generating a TAVG (an average switching period) signal by the multivibrator when a main switch current level of a buck converter reaches an average current level as a result of the above determination;

generating a signal (CH_ON) for charging/discharging a capacitor using at least the TAVG signal by the timing generator;

charging/discharging the capacitor by receiving a capacitor charging/discharging signal (CH_ON) generated from the timing generator by the integrator circuit unit and a capacitor charging/discharging current from an outside; and outputting a signal corresponding by determining a +/− state of a voltage Vc between both ends of the capacitor charged/discharged during a period by the second comparator.

Here, the average current control method further comprising increasing or decreasing a counting value by synchronizing to a clock according to an output of the second comparator by the up/down counter.

At this time, if the output of the second comparator is high H, the counting value is increased by the up/down counter, and if the output of the second comparator is low L, the counting value is decreased.

At this time, if the output of the second comparator is high H, the up/down counter increases the counting value by 1, and if the output of the second comparator is low L, the up/down counter decreases the counting value by 1.

And also, the average current control method further comprises converting an output (digital signal) of the up/down counter into an analog signal by the digital/analog converter to output the converted analog signal.

At this time, the output (digital signal) of the up/down counter is converted into an analog signal of a PPL (Pseudo Peak Level) by the digital/analog converter to output the converted analog signal.

And also, the signal (CH_ON) for charging/discharging the capacitor is generated by using an HTOFF signal which means to reach a half of the TAVG signal, a gate driving signal Q and a Toff (a continuation time of off state of the switch).

And also, if the signal (CH_ON) for charging/discharging the capacitor from the timing generator is low L, an integrator capacitor Cint is charged by turning off a PMOS (M3) of a first unit circuit of the integrator circuit unit and an NMOS (M4) of a second unit circuit; and, if the signal (CH_ON) for charging/discharging the capacitor from the timing generator is high H, the integrator capacitor Cint is discharged by turning on a PMOS (M1) of the second unit circuit and an NMOS (M2) of the first unit circuit.

And also, if a Vc being a voltage between both ends of the capacitor≤0, a low signal L is outputted; and, if the Vc≥0, a high H signal is outputted, by determining the +/− states of the voltage Vc between both ends of the capacitor by the second comparator.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 8A, 8B and 8C are views schematically showing a concept of an average current control method in accordance with the present invention;

DETAILED DESCRIPTION OF THE PREFERABLE EMBODIMENTS

The terms or words used in the present specification and claims should not be interpreted as being limited to typical or dictionary meanings, but should be interpreted as having meanings and concepts relevant to the technical spirit of the present invention based on the rule according to which an inventor can appropriately define the concept of the term to describe his/her own invention in the best manner.

Throughout the specification, when an element is referred to as "including" another element, it can further include the other element rather than exclude the other element unless the context clearly indicates otherwise. Further, the terms "unit", "module", "apparatus", etc. used in the present specification represent a unit for processing at least one function or operation and may be implemented by hardware, software, or a combination thereof.

Hereinafter, embodiments of the present invention will be described in detail with reference to the accompanying drawings.

Here, before the full description of the embodiments of the present invention, an example of a conventional overvoltage protection circuit will be described first for a better understanding of the present invention.

Figure 1:
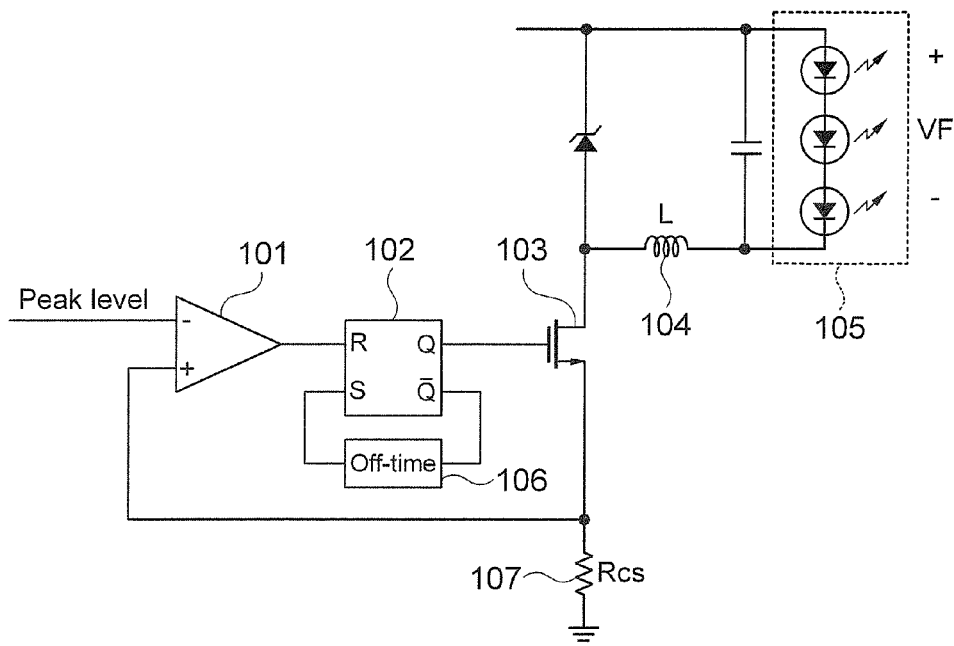
FIG. 1 is a view showing a conventional off-time control type buck converter.
Figure 2:
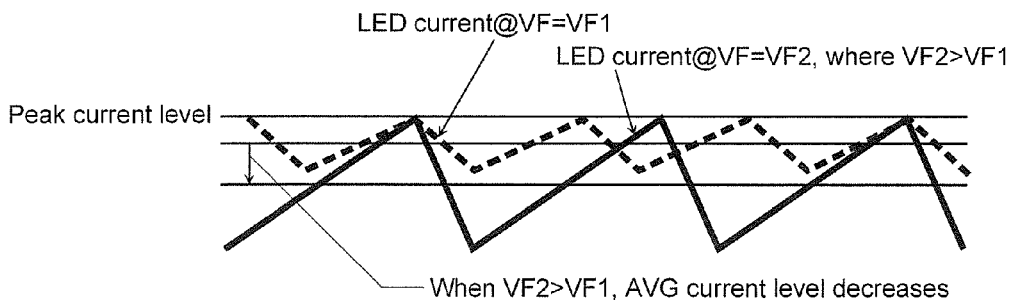
FIG. 2 is a view showing an average current change relation according to the change of a load voltage VF in the off-time control type buck converter of FIG. 1.
Figure 3:
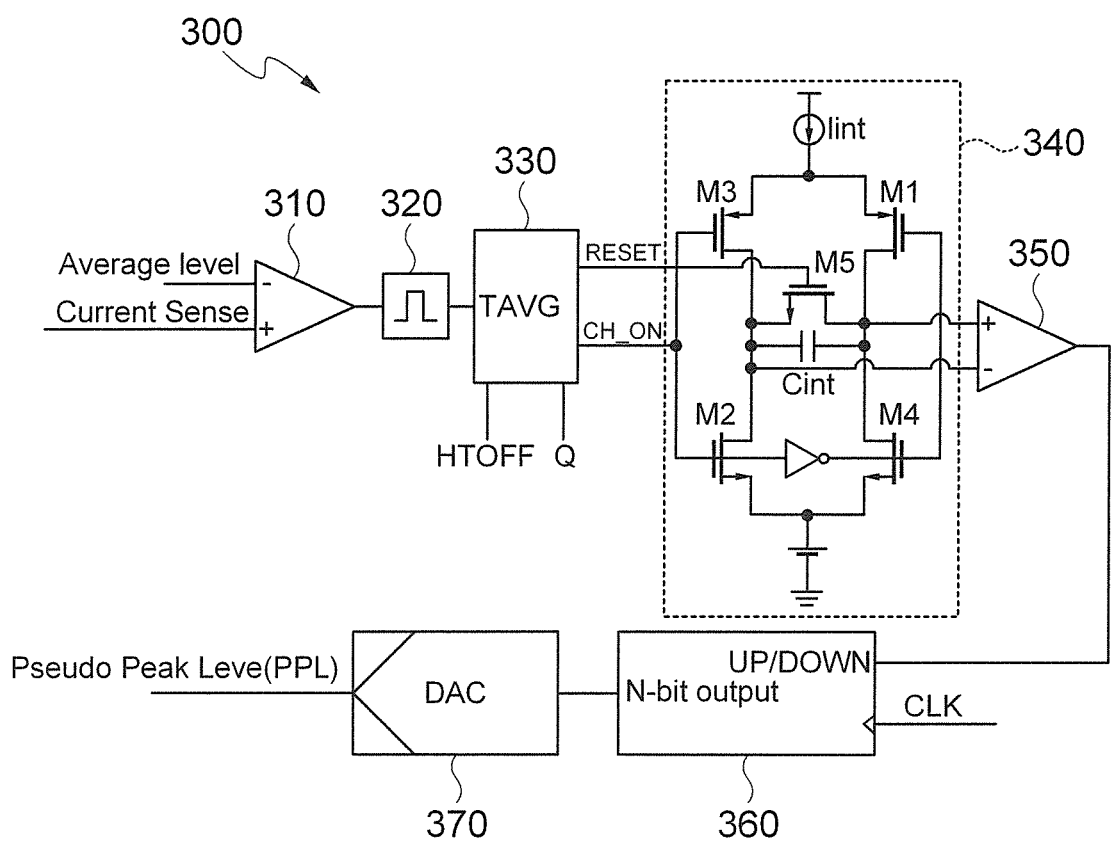
FIG. 3 is a view schematically showing a configuration of an average current controller in accordance with one embodiment of the present invention.

FIG. 3 is a view schematically showing a configuration of an average current controller in accordance with one embodiment of the present invention.

Referring to FIG. 3, the average current controller 300 in accordance with the present invention includes a first comparator 310, a multivibrator 320, a timing generator 330, an integrator circuit unit 340, a second comparator 350, an up/down counter 360 and a digital/analog converter 370.

The first comparator 370 generates a high H signal when a current level of a main switch 440 (referring to FIG. 4) of a buck converter reaches an average current level.

The multivibrator 320 generates a TAVG (average switching period) pulse signal by receiving the high H signal outputted from the first comparator 310. Herein, a monostable multivibrator may be used as the multivibrator 320.

The timing generator 330 generates the signal CH_ON for charging/discharging the capacitor Cint by using at least the TAVG signal. That is, the timing generator 330 generates the signal CH_ON for charging/discharging the capacitor Cint by using the TAVG signal, the gate driving signal Q and the HTOFF signal which means to reach a half of the Toff (the continuation time of off state of the switch). And also, the timing generator 330 generates a reset signal to initialize the capacitor Cint of the integrator circuit unit 340.

The integrator circuit unit 340 charges/discharges the capacitor Cint by receiving an capacitor charge/discharge signal CH_ON generated from the timing generator 330 and a capacitor charge/discharge current Iint from the outside. The integrator circuit unit 340 may be formed by including an integrator capacitor Cint to perform a charging/discharging operation by receiving the charge/discharge current Iint from the outside; and a plurality of switches M1~M4 for charging/discharging the integrator capacitor Cint.

And also, the integrator circuit unit 340 can further include an additional switch M5 for initializing the integrator capacitor Cint by being switched on by receiving the reset signal outputted from the timing generator 330.

At this time, the plurality of switches M1~M4 form a first unit circuit and a second unit circuit connected in parallel to each other; and each of the unit circuits is constituted of a serial connection circuit of a PMOS and an NMOS. That is, the switches M3 and the M2 forms the first unit circuit and the switches M1 and M4 form the second unit circuit. The first and the second unit circuits have a mutually parallel connection relation. And, the M3 and M2 constituting the first unit circuit are the PMOS and the NMOS, respectively and have the mutually serial connection relation. Like this, the switches M1 and M4 constituting the second unit circuit are the PMOS and the NMOS, respectively, and these have the mutually serial connection relationship.

At this time, and also, if the signal CH_ON for charging/discharging the capacitor generated from the timing generator 330 is low L, the integrator capacitor Cint is charged by allowing the PMOS M3 of the first unit circuit and the NMOS M4 of the second unit circuit to be turned on; and, if the signal CH_ON for charging/discharging the capacitor generated from the timing generator 330 is high H, the integrator capacitor Cint is discharged by allowing the PMOS M1 of the second unit circuit and the NMOS M2 of the first unit circuit to be turned on.

The second comparator 350 outputs a corresponding signal by determining the +/− state of the voltage between both ends of the capacitor Cint charged/discharged during one period. If the Vc being a voltage between both ends of the capacitor≤0, the second comparator outputs a low signal L; and, if Vc>0, the second comparator 350 outputs a high signal H.

The up/down counter 360 increases or decreases the counting value by being synchronized to the clock CLK according to the output of the second comparator 350. If the output of the second comparator 350 is high H, the up/down counter 360 increases the counting value by being synchronized to the clock CLK; and, if the output of the second comparator 350 is low L, it decreases the counting value. At this time, in case when the output of the second comparator 350 is high H, for example, the up/down counter 360 increases the counting value by 1; and, in case when the output of the second comparator 350 is low L, it decreases the counting value by 1.

The digital/analog converter 370 converts the output (a digital signal) of the up/down counter 360 into an analog signal to output the converted analog signal. At this time, it is preferable that the digital/analog converter 370 converts the output (a digital signal) of the up/down converter 360 into an analog signal of a PPL (Pseudo Peak Level) to output the converted analog signal.

Figure 4:
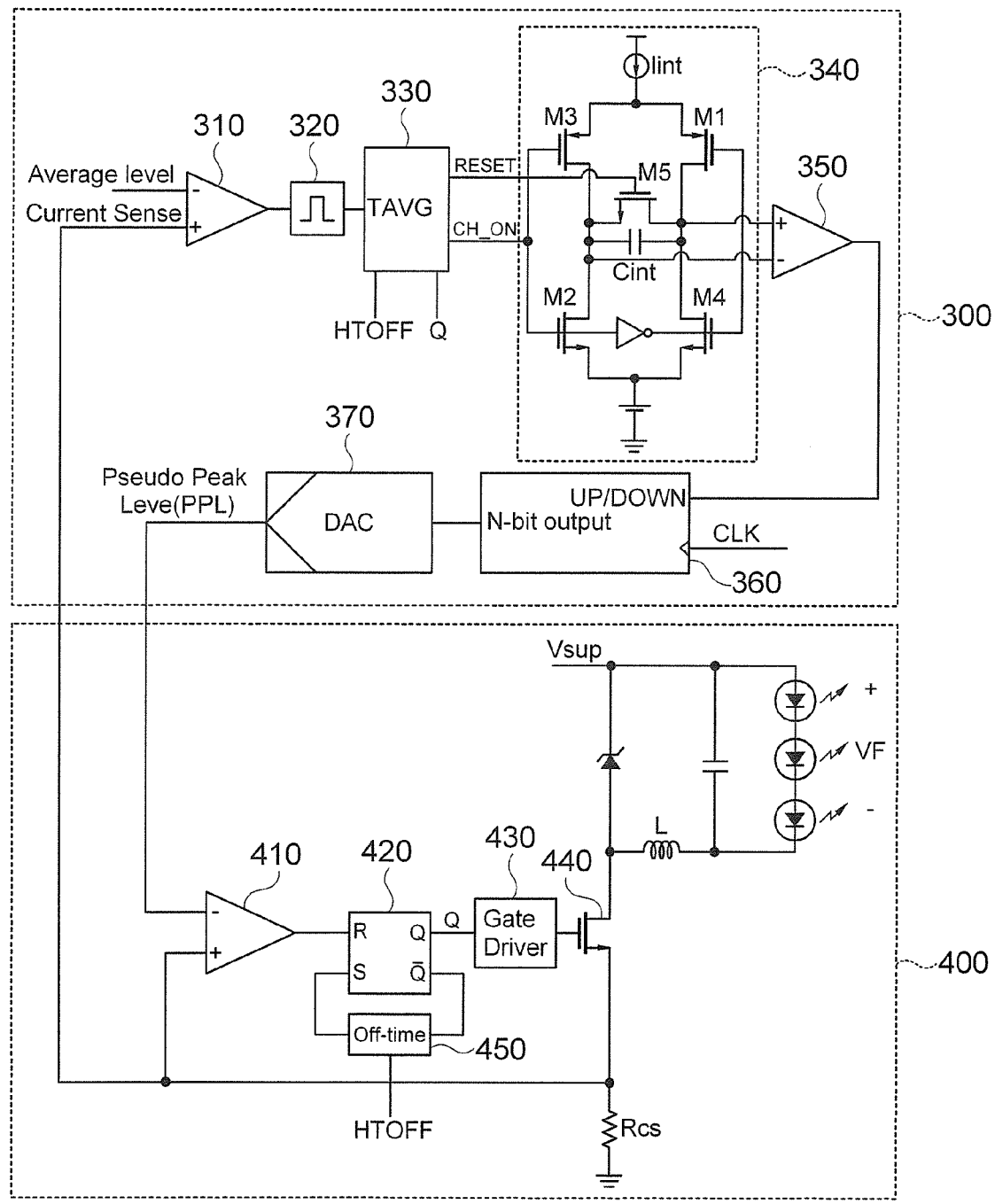
FIG. 4 is a view showing a configuration of a buck converter using an average current controller in accordance with one embodiment of the present invention.

FIG. 4 is a view showing a configuration of a buck converter using an average current controller in accordance with one embodiment of the present invention.

Referring to FIG. 4, the buck converter using the average current controller in accordance with the present invention includes an average current controller unit 300 and a buck converter unit 400.

The average current controller unit 300 generates a TAVG (an average switching period) signal by comparing a current level flowing a main switch 440 of the buck converter to an average current level when the current level of the main switch 440 reaches the average current level, performs the generation of capacitor charging/discharging signal CH_ON and the charging/discharging of the capacitor Cint by using the TVAG signal, and outputs a corresponding signal by determining the +/− state of the voltage Vc between both ends of the capacitor Cint charged/discharged during one period.

The buck converter unit 400 compares the level of the output signal from the average current controller unit 300 to a current level flowing into the main switch 440; and, if the current level flowing into the main switch 440 is larger than the level of the output signal from the average current controller unit 300, it turns off the main switch 440 by resetting an SR latch 420.

Herein, the average current controller unit 300, as described above, includes a first comparator 310 for generating a high H signal when the current level of the main switch 440 of the buck converter reaches an average current level; a multivibrator 320 for generating a TAVG (an average switching period) pulse signal by receiving the high H signal by the first comparator 310; a timing generator 330 for generating a signal CH_ON to charge/discharge the capacitor Cint by using at least the TAVG signal; an integrator circuit unit 340 for charging/discharging the capacitor Cint b receiving the capacitor charging/discharging signal CH_ON generated from the timing generator 330 and a capacitor charging/discharging current Iint from the outside; a second comparator 350 for outputting a corresponding signal by determining the +/− state of the voltage Vc between both ends of the capacitor Cint charged/discharged during one period; an up/down counter 360 for increasing or decreasing a counting value by being synchronized to a clock CLK according to the output of the second comparator 350; and a digital/analog converter 379 for converting an output (a digital signal) of the up/down counter 360 into an analog signal to output the converted analog signal.

And also, the buck converter unit 400 includes a comparator (a third comparator) 410 for comparing the level of the output signal from the average current controller unit 300 to a current level flowing into the main switch 440 to output a signal corresponded according to the comparison results; an SR latch 420 for outputting a signal to allow the main switch 440 to turn off or on by receiving the output from the comparator (the third comparator) 410; and a gate driver 430 for turning off or on the main switch 440 by being driven according to the signal of the SR latch 420.

Herein, it is preferable that, if the main switch 440 is turned off, the present invention can further include a timer 450 to allow the main switch 440 to be turned on by setting the SR latch again after a predetermined time by measuring the off-time.

And then, an average current control method by an average current controller in accordance with the present invention having the above-described construction will be explained.

Figure 5:
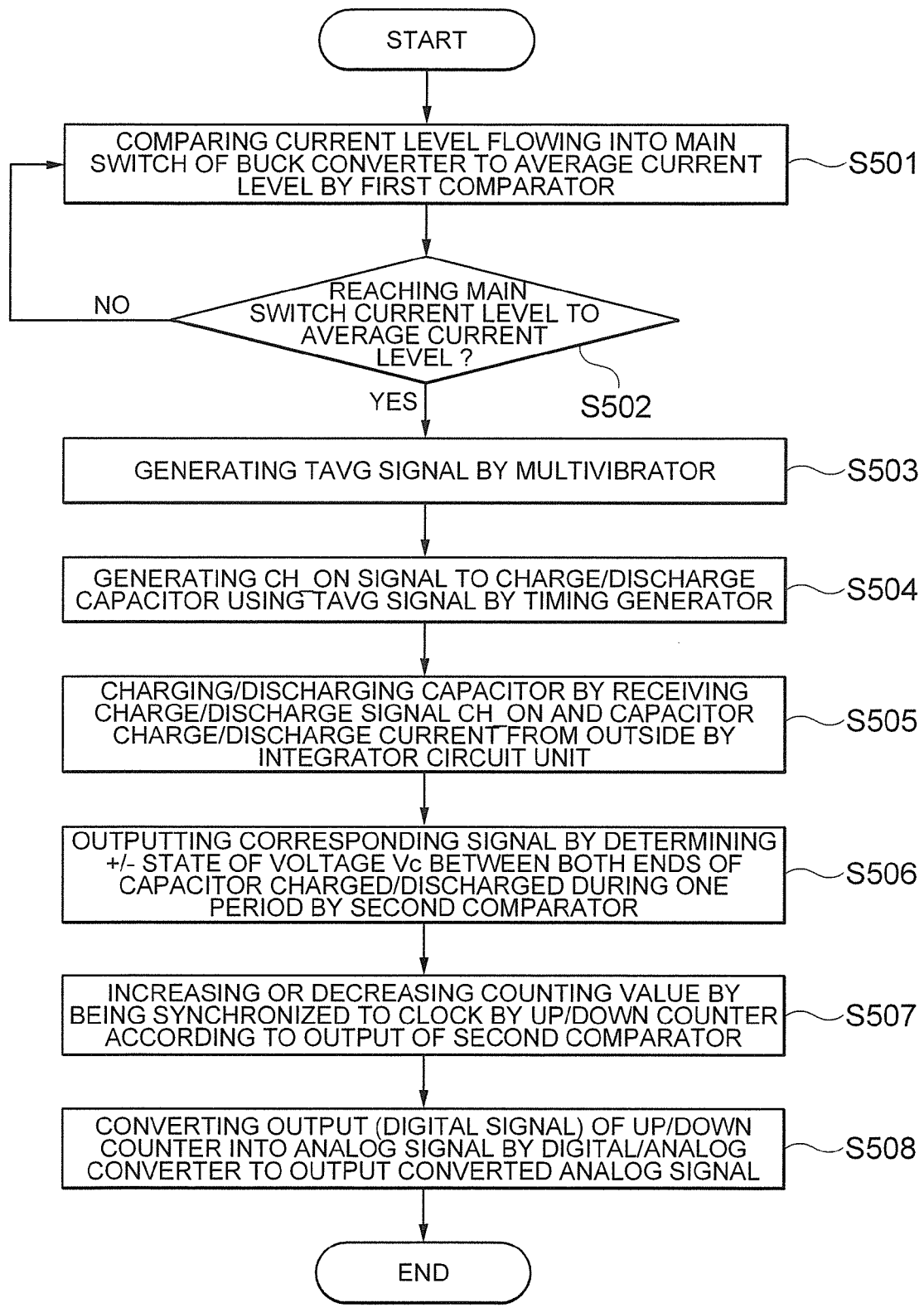
FIG. 5 is a flow chart schematically showing a process of an average current control method in accordance with another embodiment of the present invention.

FIG. 5 is a flow chart schematically showing a process of an average current control method in accordance with another embodiment of the present invention.

Referring to FIG. 5, the average current control method in accordance with the present invention is as an average current control method by an average current controller formed by including the above-described first comparator 310, the multivibrator 320, the timing generator 330, the integrator circuit unit 340, the second comparator 350, the up/down counter 360 and the digital/analog converter 370, it includes the steps of: comparing a current level flowing into the main switch 440 of the buck converter at first by the first comparator 310 (S501); and determining whether the current level of the main switch 440 of the buck converter reaches the average current level or not (S502).

According to the determination result, if the current level of the main switch 440 of the buck converter does not reach the average current level, the current level of the main switch 440 and the average current level are continuously compared. And, the current level of the main switch 440 of the buck converter reaches the average current level, the first comparator 310 generates the high H signal and the multivibrator 320 which receives the high H signal generates the TAVG (the average switching period) pulse signal (S503).

Thereafter, the signal CH_ON for charging/discharging the capacitor using at least the TAVG signal is generated by the timing generator 330 (S504). At this time, the signal CH_ON for charging/discharging the capacitor can be generated by the timing generator 330 using a HTOFF signal which represents reaching the half of the TAVG signal, the gate driving signal Q and the Toff (the continuation time of the off state of the switch).

If the signal CH_ON for charging/discharging the capacitor by the timing generator 330 is generated, the capacitor Cint is charged/discharged by receiving the capacitor charging/discharging signal CH_ON generated from the timing generator 330 by the integrator circuit unit 340 and the capacitor charging/discharging current Iint from the outside (S505). That is, if the signal CH_ON for charging/discharging the capacitor generated from the timing generator 330 is low L, the integrator capacitor Cint is charged by turning on the PMOS (M3) of the first unit circuit of the integrator circuit unit 340 and the NMOS (M4) of the second unit circuit; and, if the signal CH_ON for charging/discharging the capacitor generated from the timing generator 330 is high H, the integrator capacitor Cint is discharged by turning on the PMOS (M1) of the second unit circuit and the NMOS (M2) of the first unit circuit.

A corresponding signal is outputted by determining the +/− state of the voltage Vc between both ends of the capacitor charged/discharged during one period by the second comparator 350 (S506). For example, by determining the +/− state of the voltage Vc between both ends of the capacitor by the second comparator 350, if the voltage Vc between both ends of the capacitor≤0, a low L signal is outputted; and, if the Vc>0, the high H signal is outputted.

Herein, the average current control method can further include the step of increasing or decreasing the counting value by being synchronized to the clock by the up/down counter 360 according to the output of the second comparator 350 (S507).

At this time, if the output of the second comparator 350 by the up/down counter 30 is high H, the counting value is increased; and, if the output of the second comparator 350 is low L, the counting value is decreased.

At this time, and also, if the output of the second comparator 350 by the up/down counter 360 is high H, for example, the counting value is increased by 1; and, if the output of the second comparator 350 is low L, the counting value is decreased by 1.

And also, the average current control method can further include the step of converting the output (a digital signal) of the up/down counter 360 into an analog signal by the digital/analog converter 370 to output the converted analog signal (S508).

At this time, the output (a digital signal) of the up/down counter 360 is converted into an analog signal of a PPL (Pseudo Peak Level) by the digital/analog converter 370 to output the converted analog signal.

In the above-described serial processes, the generation of signal CH_ON for charging/discharging the capacitor Cint by the timing generator in the step S504 and the charging/discharging the capacitor Cint by the integrator circuit unit 340 in the step S505 will be described in addition hereinafter.

Figure 6:
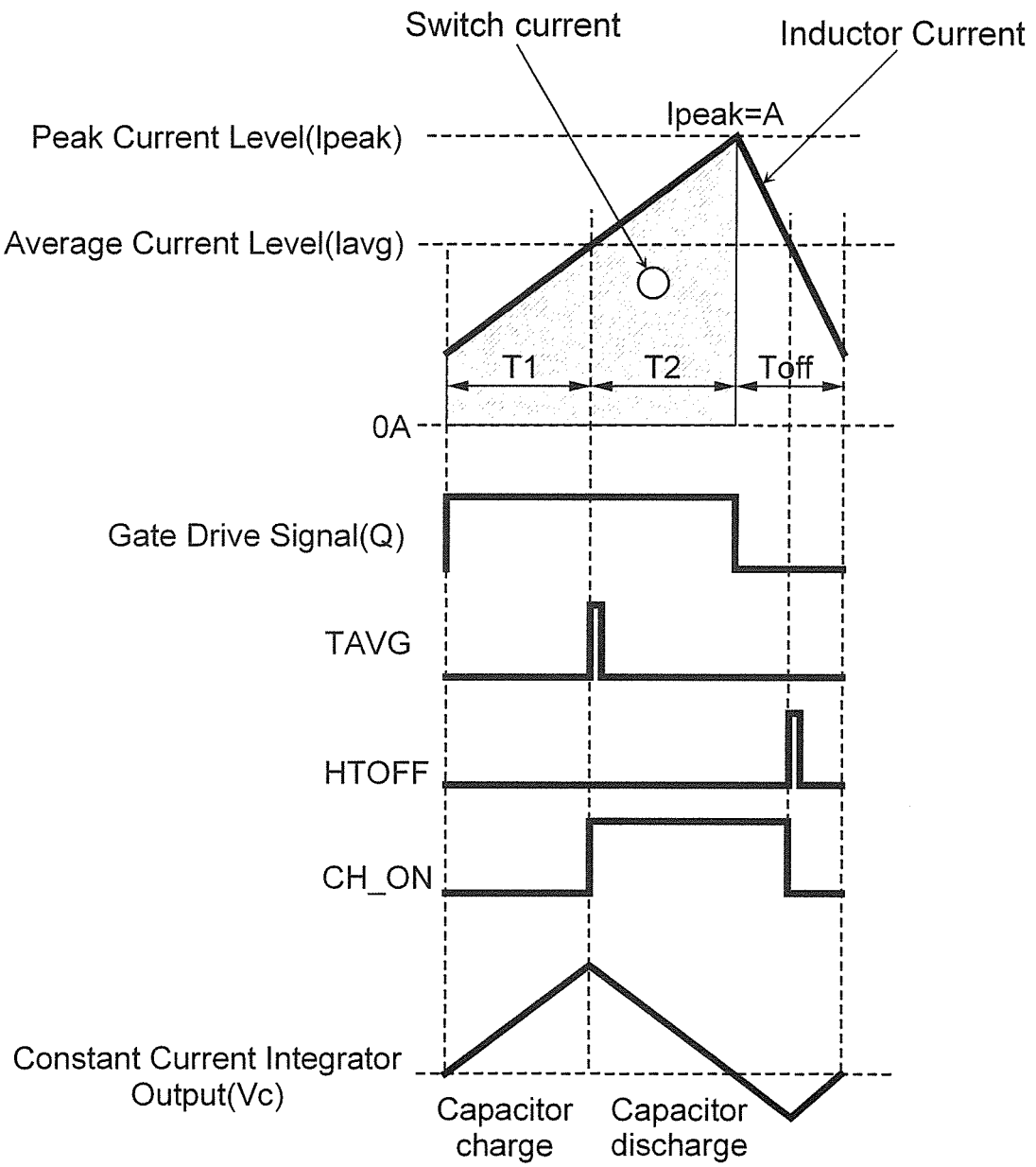
FIG. 6 is a view schematically explaining a timing relation between a TAVG signal and an HTOFF signal generated in the buck converter using the average current controller in accordance with one embodiment of the present invention.

FIG. 6 is a view schematically explaining a timing relation between a TAVG signal and an HTOFF signal generated in the buck converter using the average current controller in accordance with one embodiment of the present invention.

Referring to FIG. 4 and FIG. 6, the output of the first comparator 310 as described above becomes high H at the point where two current levels become to be equal to each other by comparing the current level of the main switch of the buck converter to the average current level Iavg; and the TAVG pulse is generated by the following multivibrator 320.

Figure 7:
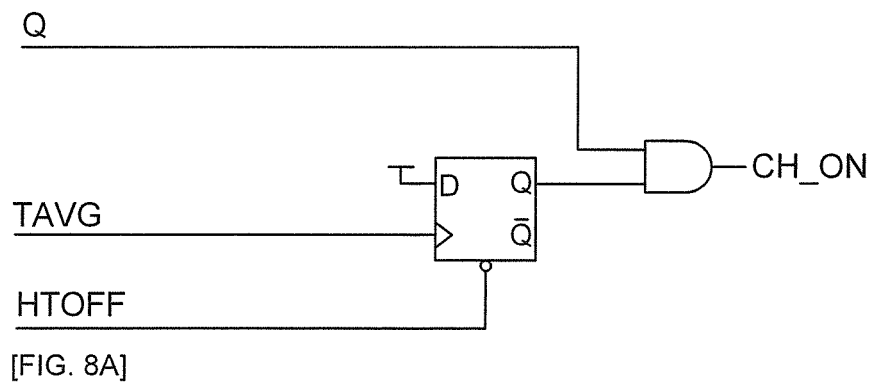
FIG. 7 is a view showing a CH_ON generation circuit incorporated into the timing generator of the average current controller in accordance with one embodiment of the present invention.
Figure 7:
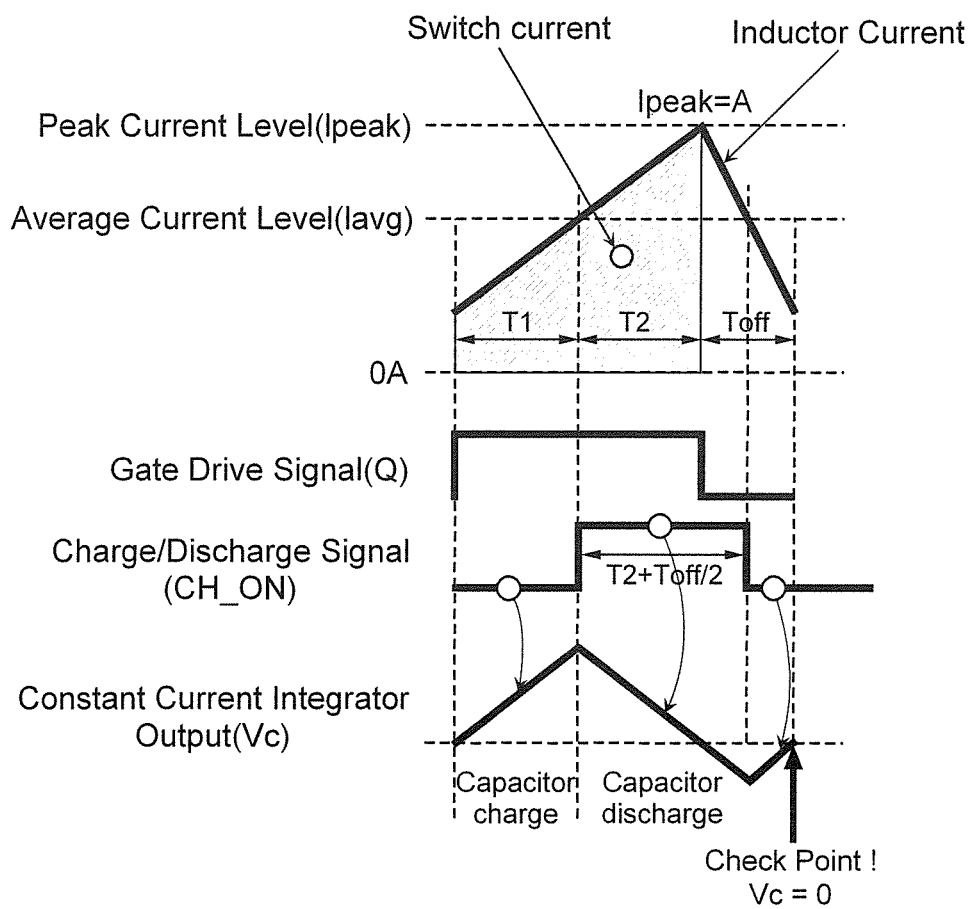

And also, the gate driving signal Q outputted from the gate driver 430 from the SR latch 420 is low L; and, if the time corresponding to a half of the Toff which passes, the HTOFF pulse is generated by the timer 450. Accordingly, if the circuit (the CH_ON generation circuit) as shown in FIG. 7 is constructed by using the gate driving signal Q, the TAVG pulse signal and the HTOFF pulse signal, the CH_ON signal as shown in FIG. 6 can be generated. Herein, the CH_ON generation circuit as shown in FIG. 7 is incorporated into the timing generator 330.

Figure 8B:
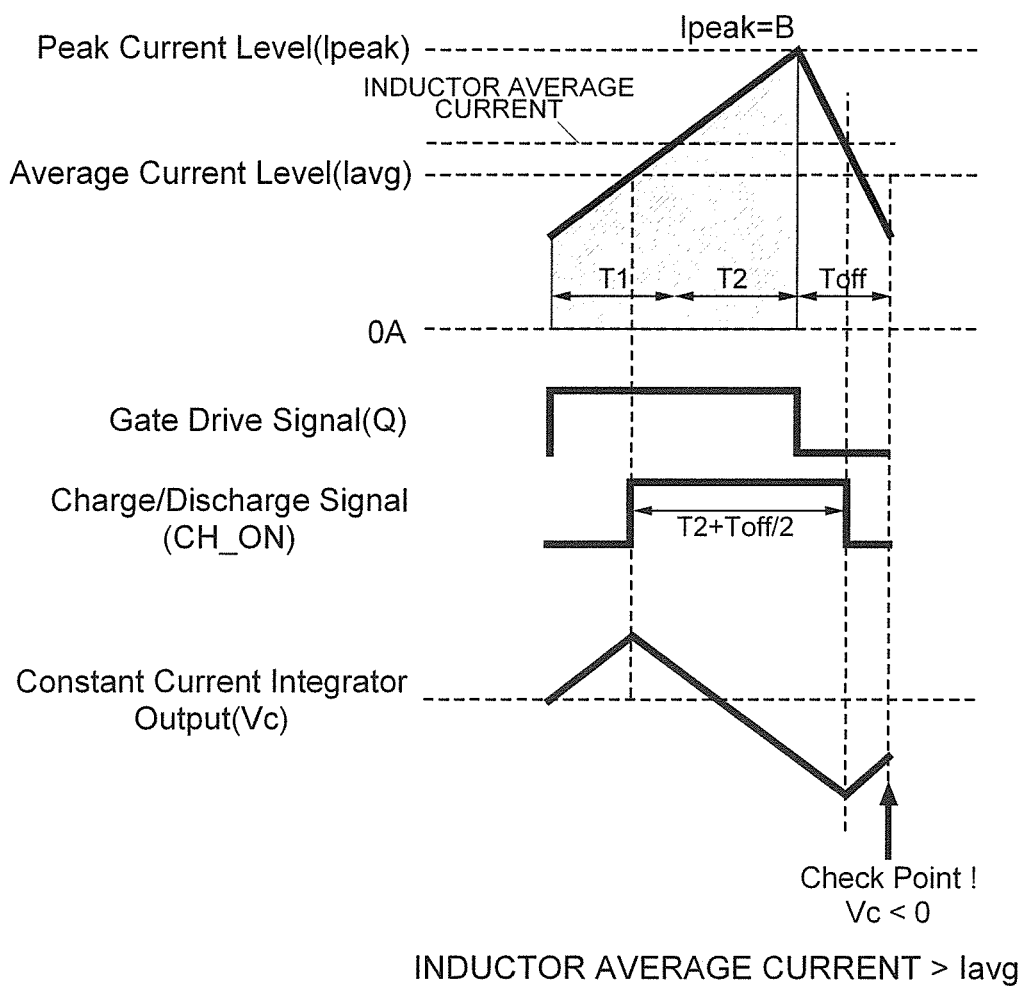
Figure 8C:
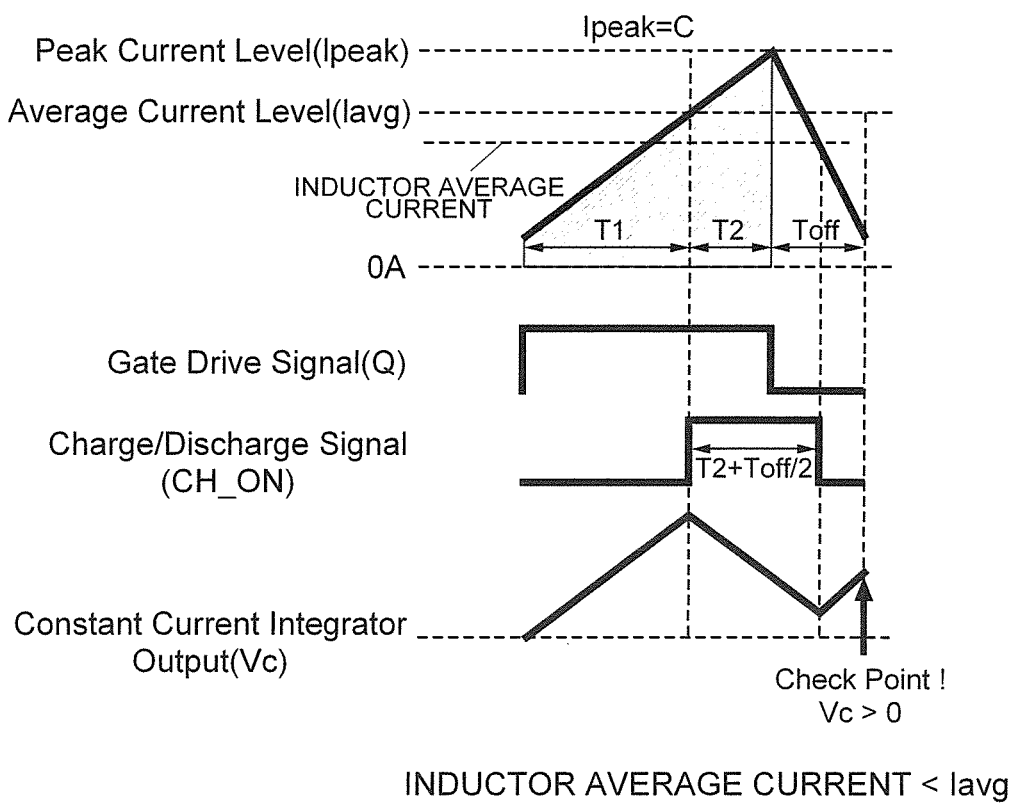

FIG. 8 is a view schematically showing a concept of an average current control method in accordance with the present invention.

Referring to FIG. 8, the T1 is the time when the current of the switch 440 reaches the average current level Iavg set by the current by starting to the switching of the main switch 440 of the buck converter unit 400; and the T2 is the time when the current of the switch 440 reaches the Ipeak as the peak current level set at the average current level Iavg. And also, the T means a switching period and the Toff has a constant value as a time when the switch 440 is turned off.

As shown in FIG. 8, the CH_ON pulse signal (the charging/discharging signal) generated during the T2 and the Toff/2 period is generated.

The capacitor Cint is charged with a constant current at a period that the CH_ON is low L. Accordingly, a rising capacitor voltage Vc is generated. And also, at a period that the CH_ON is high H, the capacitor is discharged with the same current. Accordingly, the falling capacitor voltage Vc is generated.

If the average current of the inductor is equal to the Iavg, i.e., the case of (a) in FIG. 8, since T2+Toff/2=T/2 to be equal to the capacitor charge/discharge time, if it starts at Vc=0 (zero), the Vc also becomes 0 (zero) after one period.

As shown in (b) of FIG. 8, if the average current of the inductor is larger than Iavg, it satisfies the condition that T2+Toff/2>T/2, the Vc becomes smaller than 0 after one period.

Figure 9A:
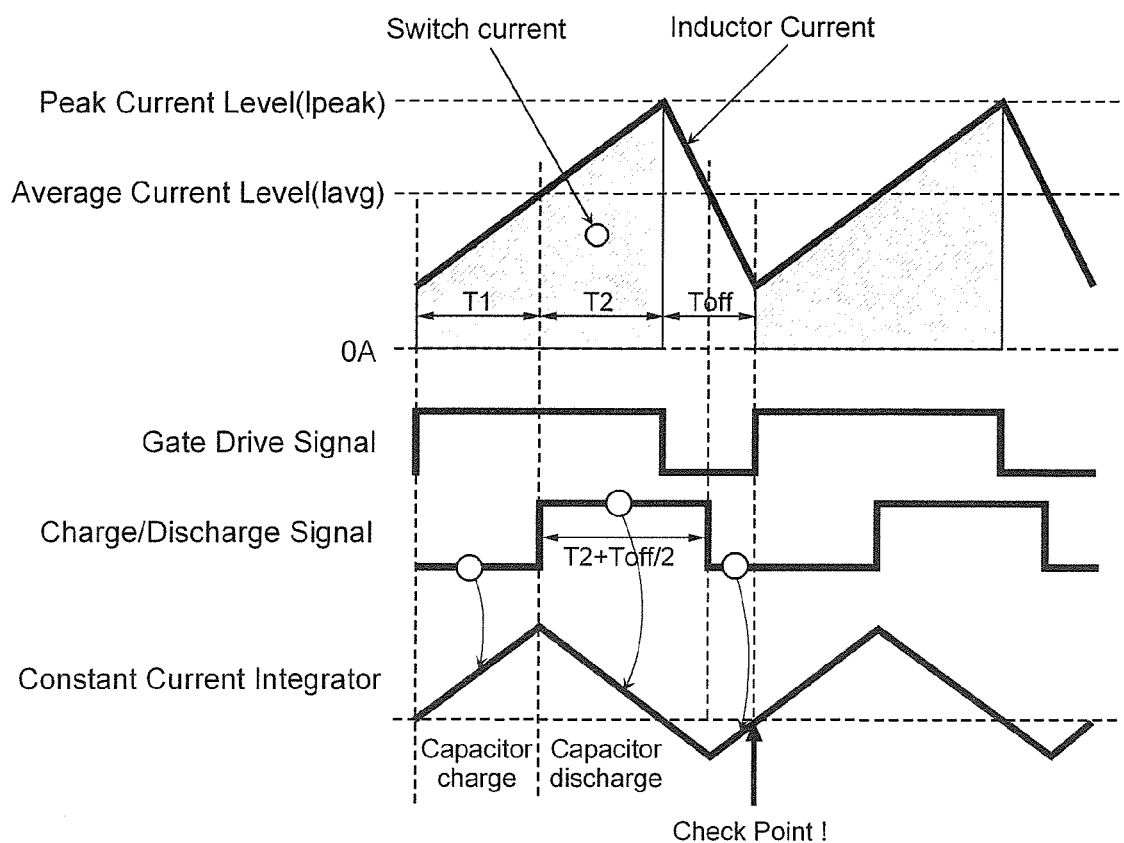
FIGS. 9A and 9B are views schematically comparing and explaining the average current control method in accordance with the present invention and the conventional average current control method.
Figure 9B:
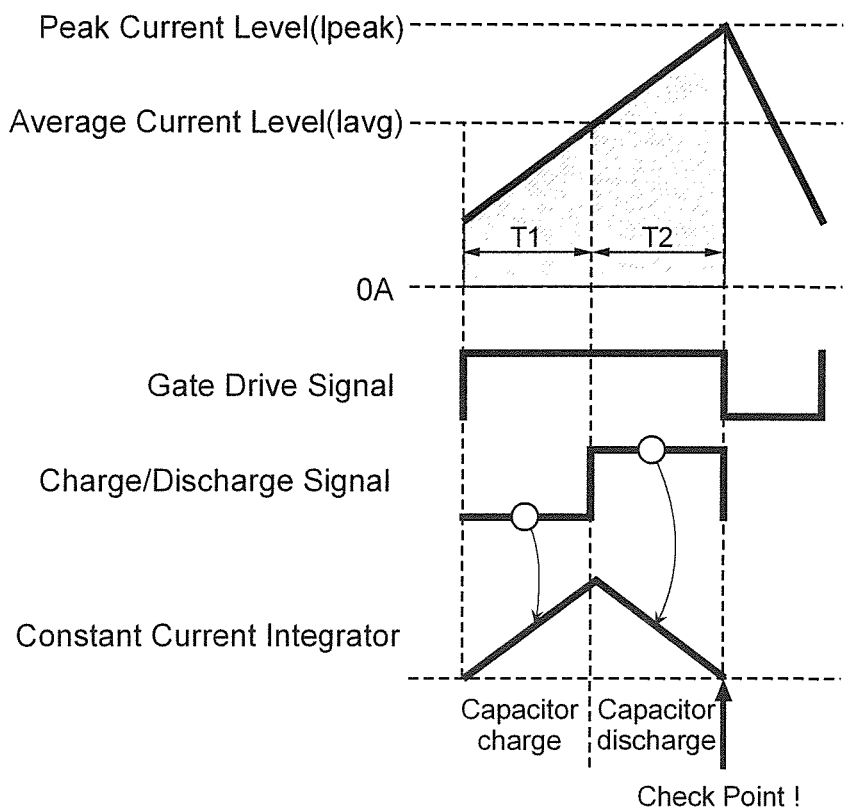

FIG. 9 is a view schematically comparing and explaining the average current control method in accordance with the present invention and the conventional average current control method.

As shown in FIG. 9, the conventional method ((b) of FIG. 8) controls in such a way that T1=T2, whereas the present method controls in such a way that T2+Toff/2=T/2. At this time, the time of Toff/2 is easily found from the timer 450 (referring to FIG. 4).

As described the above, in the present method, the capacitor is discharged with a constant current during the time of T2+Toff and it is charged with the same current during the remaining time.

If the capacitor voltage charged/discharged during one period becomes larger than 0, it means that T1>T2, since it means that the current of the switch 440 does not reach the average current level yet, it increases the peak reference level. On the other hand, if the capacitor voltage charged/discharged during one period becomes below 0, it means that T1<T2, since it means that the current of the switch 440 reaches the average current level, it decreases the peak reference level.

Since the present invention method utilizes the whole period, although the on-time is short, it operates smoothly in comparison with the conventional method which used only the T1 and T2.

And also, the present invention method can be implemented by using only one comparator to compare with the average current. Accordingly, the problem due to the delay time of the comparator can be drastically reduced in comparison with the conventional method.

Figure 10:
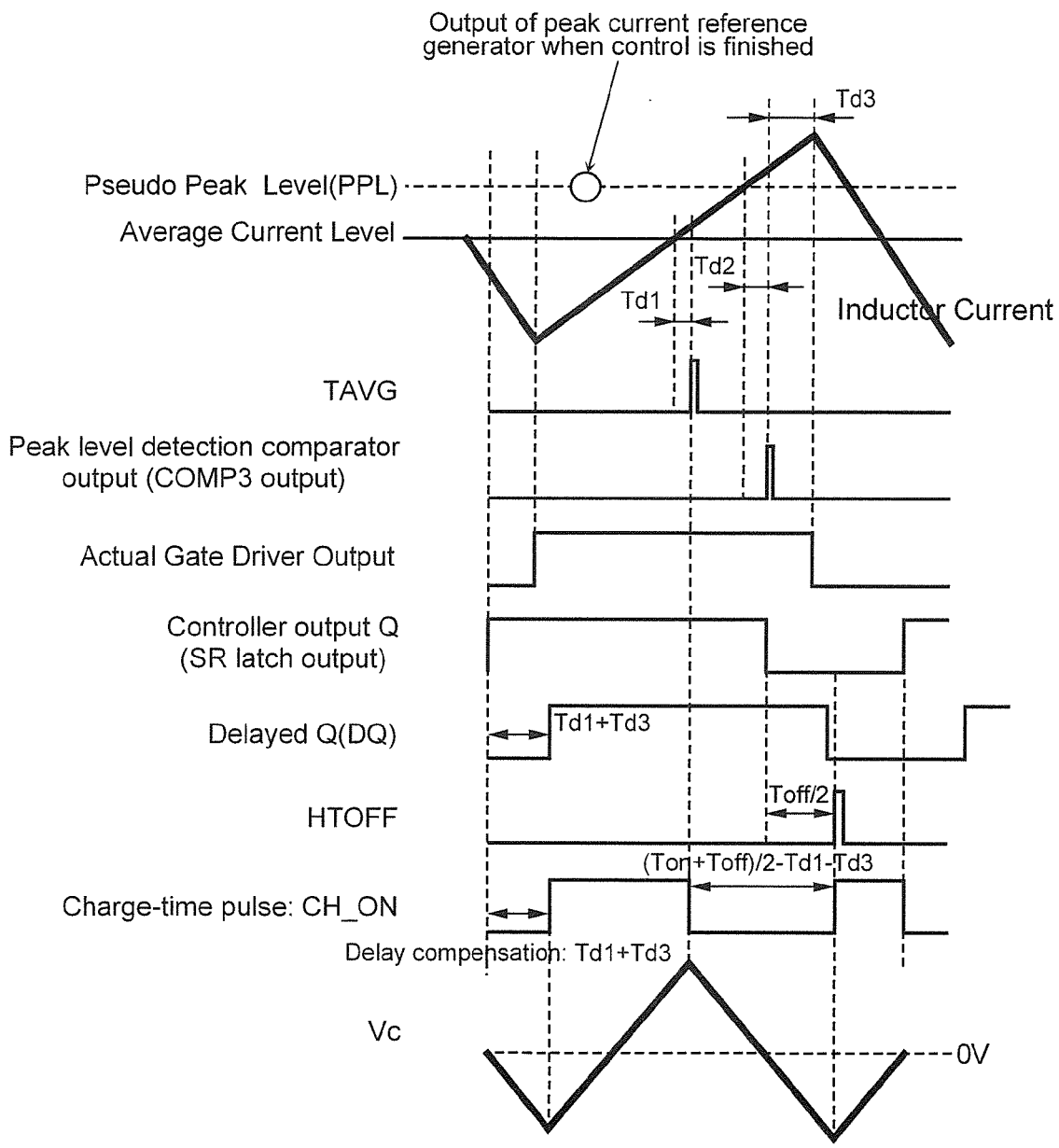
FIG. 10 is a view schematically explaining a delay and a delay compensation relation generated in the average current controller in accordance with the present invention and the buck converter using the same.

On the other hand, FIG. 10 is a view schematically explaining a delay and a delay compensation relation generated in the average current controller in accordance with the present invention and the buck converter using the same.

Referring to FIG. 10, in the average current controller of the present invention and the buck converter using the same, the operations of the comparators (the first comparator 310 and the third comparator 410) and the gate driver 430 are delayed due to the parasitic capacitor components. Herein, the delays of each device are defined as follows:

The delay of the first comparator 310: Td1
The delay of the third comparator 410: Td2
The delay of the gate driver 430: Td3

When the average current control is finished due to the above-described delays, the time corresponding to the T2+Toff/2 can be substantially represented as follows:

$$(T+Toff)/2-(Td1+Td3)$$

That is, the difference in time is generated as much as Td1+Td3 by the delays of the first comparator 310 and the gate driver 430. If this value is not compensated, since the average current controller controls in such a way that T+Toff/2.

In order to solve such problems, as shown in the drawings, the present invention compensates the delays by discharging the capacitor Cint during the period of Td1+Td3.

If the above-described compensation method is used, it is controlled so that the PPL signal is set to be lower than the practical peak current level.

Figure 11:
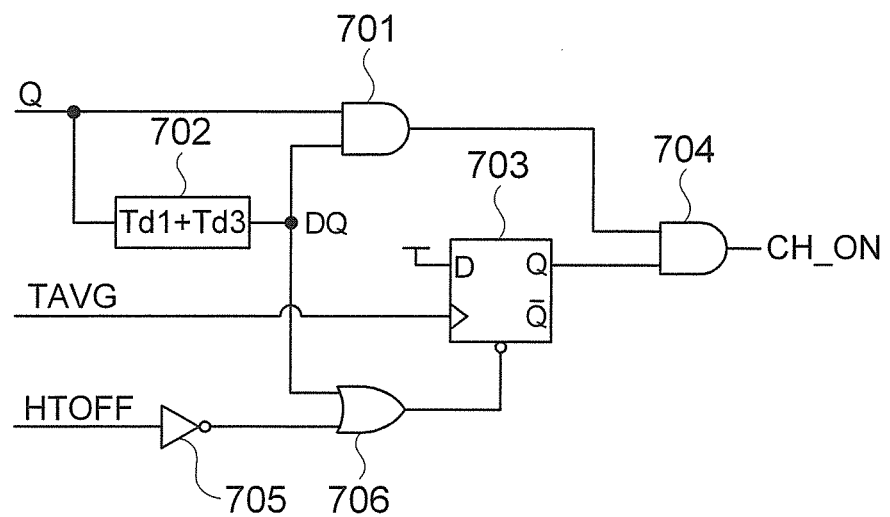
FIG. 11 is a view showing an inner circuit configuration of the timing generator provided with a delay compensation circuit in the buck converter using the average current controller in accordance with the present invention.

FIG. 11 is a view showing an inner circuit configuration of the timing generator provided with a delay compensation circuit in the buck converter using the average current controller in accordance with the present invention.

That is, the delay compensation timing generator employed into the present invention includes a gate driving signal Q outputted from an SR latch of the buck converter, a first AND gate 701 to calculate a logic AND by receiving a signal DQ which is obtained by delaying the gate driving signal during a predetermined time Td1+Td3, an inverter (a NOT gate) 705 to output a signal of the opposite value by receiving a HTOFF signal, an OR gate 706 to calculate the logic AND by receiving the output signal of the inverter (the NOT gate) 705 and the signal DQ which is obtained by delaying the gate driving signal during the predetermined time Td1+Td3, a D flip-flop 703 to receive the output signal of the OR gate 706 and the TAVG signal and delay these signals and to output the delayed signals and a second AND gate 704 to calculate the logic AND by receiving the output signal from the D flip-flop 703 and the output signal from the first AND gate 701.

Since CH_ON=L is maintained during the Td1+Td3 although the Q is high at the above delay compensation timing generator, the capacitor is discharged during this period without being charged. That is, the voltage Vc between both ends of the capacitor Cint is reduced. Accordingly, the Td1+Td3 are compensated.

As described above, the average current controller in accordance with the present invention and the buck converter using the same compare only the average current by the comparators; and, by controlling in such a way that the T2 (the time to reach the Ipeak in the Iavg)+the Toff/2=the T/2 (the T is the switching period), the problems that the average current level is changed due to the delay generated in two comparators in the conventional average current controller and the current control becomes difficult in case when the on-time is short can be overcome.

In accordance with the present invention, by comparing only the average current by the comparator and controlling so that T2 (the time to reach the Ipeak from the Iavg)+Toff/2=t/2 (the T is a switching period), it can overcome the problems that the average current level is changed due to the delay generated at two comparators in the conventional average current controller and the control of the current becomes difficult in case when the on-time is short.

Although the preferable embodiments of the present invention have been described in detail above, the present invention is not limited to the embodiments and it will be appreciated by those skilled in the art that various modifications and applications may be made in the embodiments without departing from the technical spirit of the present invention. Therefore, the range of protection of the present invention should be interpreted from the appended claims and all technical spirits within the range equivalent to the range should be interpreted as being included in the range of the rights of the present invention.

What is claimed is:

1. An average current controller comprising:
    a first comparator for generating a high H signal when a current level of a main switch of a buck converter reaches an average current level;
    multivibrator for generating a TAVG (an average switching period) pulse signal by receiving a high H signal outputted from the first comparator;
    a timing generator for generating a signal CH_ON to charge/discharge a capacitor by using at least the TAVG pulse signal;
    an integrator circuit unit for charging/discharging the capacitor by receiving the capacitor charging/discharging signal CH_ON generated from the timing generator and a capacitor charging/discharging current from the outside;
    a second comparator for outputting a corresponding signal by determining whether a voltage Vc between both ends of the capacitor charged/discharged during a period is a positive(+) or a negative(−);
    an up/down counter for increasing or decreasing a counting value by synchronizing a clock according to an output of the second comparator; and
    a digital/analog converter for outputting by converting an output (digital signal) of the up/down counter into an analog signal,
    wherein the average current controller controls in such a way that T2+Toff/2=T/2 (T2: a time when the current level of the main switch reaches a peak current level front the average current level, Toff: a continuation time of the main switch off state, and T: a switching period of the main switch), and
    wherein the timing generator generates a signal CH_ON for charging/discharging the capacitor by using a HTOFF signal which means reaching a half of the TAVG signal, a gate driving signal Q and the Toff.

2. The average current controller according to claim 1, wherein the multi vibrator is a monostable multivibrator.

3. The average current controller according to claim 1, wherein the timing generator generates a reset signal for initializing the capacitor of the integrator circuit unit.

4. The average current controller according to claim 3, wherein the Integrator circuit unit includes:
    an integrator capacitor Cint to perform charging/discharging operations by receiving charging/discharging currents from outside; and
    a plurality of switches M1~M4 for charging/discharging the integrator capacitor Cint.

5. The average current controller according to claim 4, wherein the integrator circuit unit further includes an additional switch integrator capacitor M5 for initializing the integrator capacitor Cint to be switched on by receiving a reset signal outputted from the timing generator.

6. The average current controller according to claim 4, wherein the first plurality of switches M1~M4 form first and second unit circuits to be connected in parallel, each of the unit circuits is formed of a serial connection circuit of PMOS and NMOS.

7. The average current controller according to claim 6, wherein if the signal CH_ON generated from the timing generator for charging/discharging the capacitor is low L, the capacitor Cint is charged by turning on the PMOS (M3) of the first unit circuit and the NMOS (M4) of the second unit circuit, and if the signal CH_ON generated from the timing generator for charging/discharging the capacitor is high H, the capacitor Cint is discharged by turning on the PMOS (M1) of the second unit circuit and the NMOS (M4) of the first unit circuit.

8. The average current controller according to claim 1, wherein if a Vc being a voltage between both ends of the capacitor≤0, the second comparator outputs a low signal L; and, if the Vc>0, the second comparator outputs a high signal H.

9. The average current controller according to claim 1, wherein if an output of the second comparator is high H, the up/down counter increases a counting value by being synchronized to the clock CLK; and, if the output of the second comparator is low L, the up/down counter decreases the counting value.

10. The average current controller according to claim 9, wherein if an output of the second comparator is high H, the up/down counter increases a counting value by 1; and, if the output of the second comparator is low L, the up/down counter decreases the counting value by 1.

11. The average current controller according to claim 1, wherein the if an output of the digital/analog converter converts an output (digital signal) of the up/down counter into an analog signal of PLL (Pseudo Peak Level) to output the converted signal.

12. A buck converter using an average current controller, comprising:
    an average current controller for generating a TAVG (an average switching period) pulse signal by comparing a level of current flowing into a main switch of the buck converter when a current level of the main switch reaches an average current level, performing the generation of capacitor charging/discharging signal CH_ON by using the TAVG signal and charging/discharging a capacitor, and generating a corresponding signal by determining the +/− state of a voltage Vc between both ends of the capacitor charged/discharged during one period; and
    a buck converter unit for turning off the main switch by resetting an SR latch when a level of current flowing in the main switch is above a level of an output signal from the average current by comparing a level of an output signal from the average current to a level of current flowing in the main switch,
    wherein the average current controller controls in such a way that T2+Toff/2=T/2 (T2: a time when the current level of the main switch reaches a peak current level from the average current level, Toff: a continuation time of the main switch off state, and T: a switching period of the main switch), and
    wherein the average current controller includes:
        a first comparator for generating a high H signal when a main switch current of the buck converter unit reaches an average current level;
        a multivibrator for generating a TAVG (an average switching period) pulse signal by receiving a high H signal outputted from the first comparator;
        a timing generator for generating a signal CH_ON to charge/discharge a capacitor by using at least the TAVG pulse signal;
        an integrator circuit unit for charging/discharging the capacitor by receiving the capacitor charging/discharging signal CH_ON generated from the timing generator and a capacitor charging/discharging current from the outside;
        a second comparator for outputting a corresponding signal by determining whether a voltage Vc between both ends of the capacitor charged/discharged during a period is a positive(+) or a negative(−);

an up/down counter for increasing or decreasing a counting value by synchronizing a clock according to an output of the second comparator; and a digital/analog converter for outputting by converting an output (a digital signal) of the up/down counter into an analog signal, and wherein the timing generator includes:

a first AND gate for performing a logic AND operation by receiving a gate driving signal Q outputted from the SR latch of the converter unit and a signal delayed during a predetermined time (Td1+Td3) by the gate driving signal;

an inverter (NOT gate) for outputting a signal of an opposite value by receiving a HTOFF signal;

an OR gate for performing an OR operation by receiving an output signal of the OR gate and a signal DQ delayed during a predetermined time (Td1+Td3) by the gate driving signal; and a D flip-flop for outputting by being delayed at a predetermined time by receiving the output signal of the OR gate and the TAVG signal.

13. The buck converter using the average current controller according to claim 12 wherein the buck converter includes:

a comparator (a third comparator) for outputting a signal corresponding to a comparison result by comparing a level of an output signal from the average current controller unit to a level of current flowing into the main switch;

the SR latch for outputting a signal to turn on or off the main switch by receiving an output from the comparator (the third comparator); and a gate driver for turning on or off the main switch by being driven according to a signal of the SR latch.

14. The buck converter using the average current controller according to claim 13, further comprises:

a timer for turning on the main switch by setting the SR latch again after a predetermined time by measuring an off-time if the main switch is turned off.

15. An average current control method by using an average current controller which is constituted of a first comparator, a multivibrator, a timing generator, an integrator circuit unit, a second comparator, an up/down counter and a digital/analog converter, comprising:

determining whether a current level of a main switch of a buck converter reaches an average current level or not by comparing an average current level and a current level flowing into the main switch of the buck converter to the first comparator;

generating a TAVG (an average switching period) signal by the multivibrator when a main switch current level of a buck converter reaches an average current level as a result of the above determination;

generating a signal (CH_ON) for charging/discharging a capacitor using at least the TAVG signal by the timing generator;

charging/discharging the capacitor by receiving a capacitor charging/discharging signal (CH_ON) generated from the timing generator by the integrator circuit unit and a capacitor charging/discharging current from the outside; and outputting a corresponding signal by determining a +/− state of a voltage Vc between both ends of the capacitor charged/discharged during a period by the second comparator, wherein the average current controller controls in such a way that T2+Toff/2=T/2 (T2: a time when the current level of the main switch reaches a peak current level from the average current level, Toff: a continuation time of the main switch off state, and T: a switching period of the main switch), and wherein the signal (CH_ON) for charging/discharging the capacitor is generated by using an HTOFF signal which means to reach a half of the TAVG signal, a gate driving signal Q and the Toff.

16. The average current control method according to claim 15, further comprising:

increasing or decreasing a counting value by synchronizing a clock according to an output of the second comparator by the up/down counter.

17. The average current control method according to claim 16, wherein if the output of the second comparator is high H, the counting value is increased, by the up/down counter, and if the output of the second comparator is low L, the counting value is decreased.

18. The average current control method according to claim 17, wherein if the output of the second comparator is high H, the up/down counter increases the counting value by 1, and if the output of the second comparator is low L, the up/down counter decreases the counting value by 1.

19. The average current control method according to claim 15, further comprises:

converting an output (digital signal) of the up/down counter into an analog signal by the digital/analog converter to output the converted analog signal.

20. The average current control method according to claim 19, wherein the output (digital signal) of the up/down counter is converted into an analog signal of a PPL (Pseudo Peak Level) by the digital/analog converter to output the converted analog signal.

21. The average current control method according to claim 15, wherein if the signal (CH_ON) for charging/discharging the capacitor from the timing generator is low L, an integrator capacitor Cint is charged by turning on a PMOS (M3) of a first unit circuit of the integrator circuit unit and an NMOS (M4) of a second unit circuit; and, if the signal (CH_ON) for charging/discharging the capacitor from the timing generator is high H, the integrator capacitor Cint is discharged by turning on a PMOS (M1) of the second unit circuit and an NMOS (M2) of the first unit circuit.

22. The average current control method according to claim 15, wherein if a Vc being a voltage between both ends of the capacitor≤0, a low signal L is outputted; and, if the Vc>0, a high H signal is outputted, by determining the +/− states of the voltage Vc between both ends of the capacitor by the second comparator.

* * * * *